H. P. KRAFT & M. C. SCHWEINERT.
VALVE AND INDICATOR.
APPLICATION FILED MAR. 3, 1909.
1,175,270.
Patented Mar. 14, 1916.
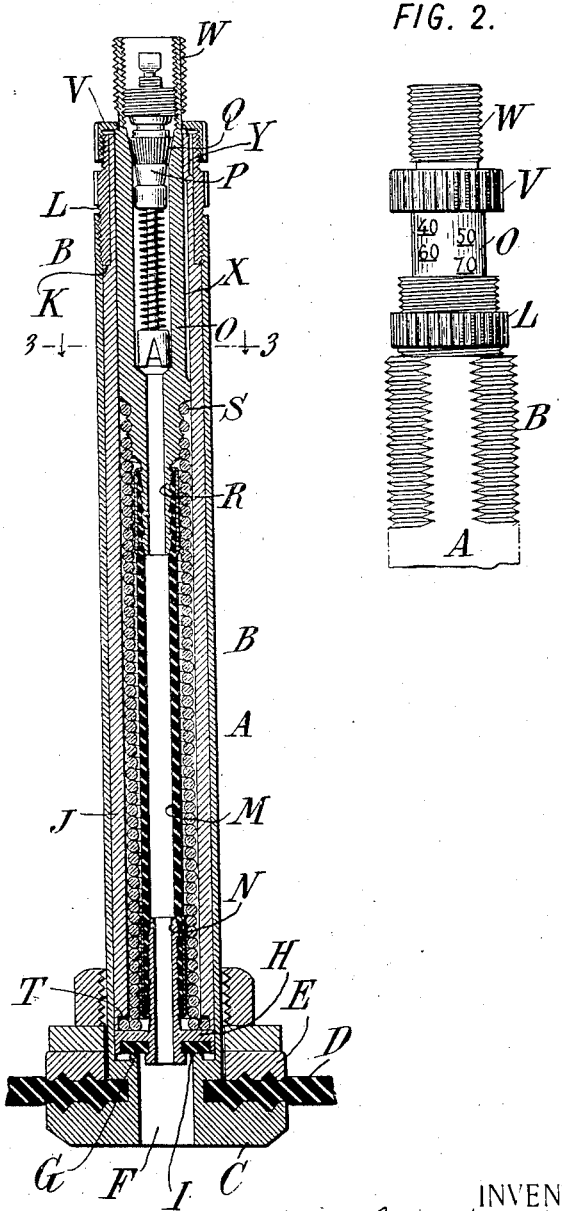
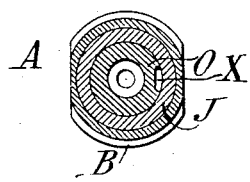
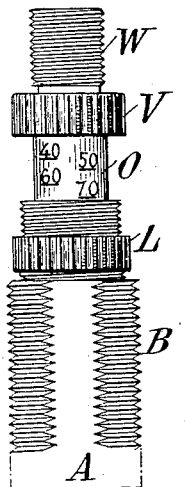
WITNESSES:
INVENTORS:
Henry P. Kraft and
Maximilian Charles Schweinert,
By Attorneys

UNITED STATES PATENT OFFICE.

HENRY P. KRAFT, OF NEW YORK, N. Y., AND MAXIMILIAN CHARLES SCHWEINERT, OF WEST HOBOKEN, NEW JERSEY.

VALVE AND INDICATOR.

1,175,270.　　　　　　　Specification of Letters Patent.　　Patented Mar. 14, 1916.

Application filed March 3, 1909. Serial No. 481,185.

*To all whom it may concern:*

Be it known that we, HENRY P. KRAFT, residing in the borough of Brooklyn, county of Kings, city and State of New York, and MAXIMILIAN CHARLES SCHWEINERT, residing in West Hoboken, in the county of Hudson and State of New Jersey, both citizens of the United States, have jointly invented certain new and useful Improvements in Valves and Indicators, of which the following is a specification.

This invention relates generally to valves for pneumatic tires and other purposes, and aims to provide certain improvements therein.

It has heretofore been proposed to combine with a pneumatic tire valve an indicating mechanism which is designed to show the pressures existing in the interior of the tire. Such devices have included a valve mechanism in which the valve proper with its seat have been slidably mounted in a valve shell, a tight joint being made between the valve seat and the tire itself by an elongated tube connected with such seat and passing downwardly through the valve shell into the tire and thence around the inner shoe or flange of the valve shell, so that its edges are clamped between such shoe and the inner tube of the tire. An indicating mechanism has been provided upon the valve seat or a part actuated thereby for showing the pressures within the tire. Such constructions have been subject to the disadvantage that it has been necessary to entirely remove the valve and its shell from the inner tube in order to obtain access to the interior of the shell or to remove the working parts.

According to our present invention we provide a structure of this general type in which all of the parts are removable from the outer end of the valve shell, so that it is not necessary to remove the shell from the tire tube in order to inspect, replace or repair the parts. The invention also includes a number of features of improvement which will hereinafter be pointed out.

Referring to the drawings which illustrate one form of our invention,—Figure 1 is a longitudinal section of a combined valve and indicator showing the invention in its closed or locked position. Fig. 2 is an elevation, at right angles to Fig. 1, of the upper part of the structure showing the operation of the indicating mechanism. Fig. 3 is a cross section taken on the line 3—3 in Fig. 1.

Referring to the drawings let A indicate the valve shell as a whole which is shown as comprising an elongated screw-threaded cylindrical portion B having at its inner end a flange or shoe C which is adapted to extend within the tire tube D, suitable nuts being provided for clamping such tube against the flange C.

The shell A is provided at its lower end with a passage F through which air is forced into the tire, such passage terminating in a shoulder G, from which point upwardly the diameter of the shell is enlarged as shown. Seated upon the shoulder G is an annular member H provided with a suitable packing I for making a tight joint between such member and the shoulder G. Within the shell A is arranged a sleeve or barrel J, the lower end of which presses against the top of the member H, and forces it downwardly so that the packing G is compressed. At its upper end the sleeve J is formed with a shoulder K which is engaged by a screw threaded coupling L, such screw threaded coupling screwing into the upper end of the cylinder B. The construction thus described makes a very reliable airtight joint between the member H and the lower part of the valve shell.

The member H is designed to form an airtight connection between the lower end of an expansible tube M and the passage F of the valve shell. For this reason it is provided with an elongated nipple N, the outer surface of which is corrugated, such nipple extending within the tube M as shown. The tube and nipple may be connected by a contracted ferrule, as shown or wired or otherwise connected if desired.

Mounted in the upper part of the barrel J is the valve casing O which contains the usual valve proper P and valve seat Q. These may be of any usual type, those shown being the well-known Schrader valve. The lower part of the valve casing is formed with a nipple R to which the upper part of the expansible tube M is attached in the same manner as to the nipple N.

It will be apparent from the construction thus far described that the air within the tire communicates with the under side of the valve proper through the passage F and expansible tube M. When such air is under pressure it raises the valve casing O to an extent which is proportioned to the pressure within the tire. These movements of the valve casing O are utilized to indicate such pressures by any suitable means, the simplest being that shown wherein the upper part of the valve casing is provided with graduations showing various pressures, and the upper end of the sleeve or barrel J is utilized as a pointer by means of which the pressures are read.

In order to place a load upon the movement of the valve casing O a spring S is provided, one end of which is connected to the valve casing as shown and the other end of which is connected with the lower part of the structure by the barrel J. As shown the bottom convolution of the spring is spread outwardly so as to be engaged by a shoulder T formed on the lower end of the barrel. The spring S also performs another important function of protecting the expansible tube M (which is usually made of rubber), so that when the latter has expanded laterally a short distance under the pressure from within the tire it presses against the convolutions of the spring and the latter so supports and protects the expansible tube that it is enabled to withstand the pressure.

By the construction just described we are enabled to so mount the valve casing with its air tube that it can be removed from the top through the outer end of the shell A. Not only is this true, but in fact the entire internal structure of the valve and indicating mechanism may be lifted out by merely unscrewing the coupling L. At the same time means are provided to make a tight joint for the lower end of the expansible tube so as to prevent leakage at this point.

It is preferable that the valve casing O and the barrel J shall be so connected that they shall not rotate with relation to each other. To this end the valve casing may be formed with a longitudinal groove X and the barrel with a projection or feather Y running in the groove, and if desired means may be provided to prevent rotation of the barrel in the cylinder B.

In valves of this type it is quite important that some means be provided for holding the valve casing in its inward position during running. This not only relieves the rubber tube of a considerable part of the tension, but it also so shortens up the device that the ordinary dust cap can be applied. Our invention provides for this purpose a coupling V which bears against a shoulder formed on the upper end of the valve casing and screws onto the coupling L as shown in Fig. 1. When the tire is to be inflated, the coupling V is unscrewed, and if there is any pressure in the tire the valve casing will rise to indicate it. The proper amount of additional air is then forced in it and the indicating mechanism shows when the desired pressure has been reached. The coupling V may be removed entirely or it may be permitted to rest upon the shoulder of the valve casing as shown in Fig. 2. When the operation of inflating is completed the valve casing is pressed down by hand, and held in its inward position by screwing up the coupling V. The ordinary dust cap is then applied.

We do not claim this feature of construction herein, the same being claimed in another application filed by us, Serial No. 478,345.

It will be understood that the structure illustrated and described is given only as an example of one application of the invention.

The invention may be applied to various other constructions and may itself be modified to a considerable degree without departing from the spirit thereof.

What we claim is:—

1. The combination of a valve shell adapted to be connected at its inner end to a tube or the like, a valve mechanism movable in said shell, an expansible member for making a tight joint between said valve mechanism and said shell, and means operable from the outer end of said shell for connecting said member to the inner end of said shell and disconnecting it therefrom.

2. The combination of a valve shell, a valve mechanism movable in said shell, an expansible tube for connecting said valve mechanism with the shell, and means for forming a tight joint between the inner end of said tube and said shell, including a barrel through which said tube passes, clamping the inner end of the tube between it and the shell, and having connection with said shell.

3. The combination of a valve shell, a valve mechanism movable in said shell, an expansible tube for connecting said valve mechanism with the shell, a flanged part on the inner end of said tube and means, including a barrel having connection with the shell, through which said tube projects, pressing said flanged part into engagement with said shell to form an air tight joint between said tube and shell.

4. The combination of a valve shell, a valve mechanism movable in said shell, an expansible tube for connecting said valve mechanism with the shell, a barrel through which said tube passes, a nipple at the lower end of said shell, means for connecting said nipple with said expansible tube, and a packing washer connected with said nipple, said packing washer being pressed downwardly by said barrel.

5. The combination of a valve shell, a valve mechanism movable in said shell, an expansible tube connected to the lower end of said valve mechanism, a spiral spring surrounding said tube and having its ends also connected to said valve mechanism, and means operable from the outer end for connecting the inner end of said expansible tube and spring with the valve shell, and disconnecting it therefrom.

6. The combination of a shell, an indicating means movable in said shell, a spring connected to said indicating means, and means operable from the outer end of said shell for connecting said spring to said shell inwardly of said indicating means and disconnecting it therefrom.

7. The combination of a shell, an indicating means movable in said shell, a spring connected to said indicating means, means for connecting said spring to the shell below or inwardly of said indicating means, said means being adapted to permit the removal of said indicating means and spring through the upper or outer end of the shell, comprising a barrel leading to the outer end of the shell, and means for holding said barrel in position.

8. The combination of a shell, an indicating means movable in said shell, a spring connected to said indicating means, an expansible tube also connected to said indicating means, and means operable from the outer end of said shell for connecting said spring and tube to the valve shell below or inwardly of said indicating means, and for disconnecting them therefrom.

9. The combination of a shell, a barrel removable through the outer end of said shell, an indicating means within said barrel, an expansible tube connected with the said indicating means, and a spring surrounding said tube, said barrel being adapted to hold the lower end of said spring and tube rigidly in the lower end of the shell.

10. The combination of a shell, a barrel removable through the outer end of said shell, an indicating means within said barrel, an expansible tube connected with the said indicating means, a spring surrounding said tube, said barrel being adapted to hold the lower ends of said spring and tube rigidly in the lower end of the shell, and a screw-threaded member for holding said barrel in place.

11. The combination of a shell adapted to be connected at its inner end to a tube or the like, an indicating member, an extensible member connecting said indicating member and shell, said parts being of no greater diameter than the greatest diameter of the bore of said shell, whereby they can be inserted and removed through the outer end of said shell, and means for connecting and disconnecting said extensible member to and from the interior of said shell, said means being operable from the outer end of said shell.

12. The combination of a shell adapted to be connected at its inner end to a tube or the like, an indicating member, and an extensible tube connecting said indicating member and shell, said parts being of no greater diameter than the greatest diameter of the bore of said shell, whereby they can be inserted and removed through the outer end of said shell, and means for connecting and disconnecting said extensible tube to and from the interior of said shell, said means being operable from the outer end of said shell.

13. The combination of a shell adapted to be connected at its inner end to a tube or the like, an indicating member, an extensible tube and a spring connecting said indicating member and shell, said parts being of no greater diameter than the greatest diameter of the bore of said shell, whereby they can be inserted and removed through the outer end of said shell, and means for connecting and disconnecting said extensible tube and spring to and from the interior of said shell, said means being operable from the outer end of said shell.

14. The combination of a valve-shell adapted to be connected at its inner end to a tube or the like, a valve mechanism movable in said shell, an extensible element between the valve-mechanism and valve-shell, a barrel surrounding said extensible element and engaging the inner end thereof, a member connecting said barrel and valve-shell and retaining the barrel in position to press upon the end of said extensible element to hold it in engagement with the shell, and means adapted to connect said member to the valve-casing.

15. The combination of a valve-shell adapted to be connected at its inner end to a tube or the like, a valve mechanism movable in said shell, an extensible member between the valve-mechanism and valve-shell, a barrel surrounding said extensible element and engaging the inner end thereof, a threaded ring having engagement with said barrel and shell and retaining said barrel in position to press upon the end of said extensible element to hold it in engagement with the shell, and means engaging said ring adapted to connect said valve-mechanism and ring together.

16. The combination of a valve-shell adapted to be connected at its inner end to a tube or the like, a valve mechanism movable in said shell, an extensible tube between the valve-mechanism and valve-shell, means for indicating pressures, a barrel surrounding said extensible tube and engaging the inner end thereof, a member connecting said barrel and valve-shell and retaining the barrel in position to press upon the end of said extensible tube to hold it in engagement with the shell, and means adapted to connect said member to the valve-casing.

17. The combination of a valve-shell adapted to be connected at its inner end to a tube or the like, a valve mechanism movable in said shell, an extensible tube between the valve-mechanism and valve-shell, calibrations upon said valve mechanism acting in conjunction with a part of said shell to indicate pressures, a barrel surrounding said extensible tube and engaging the inner end thereof, a member connecting said barrel and valve-shell and retaining the barrel in position to press upon the end of said extensible tube to hold it in engagement with the shell, and means adapted to connect said member to the valve-casing.

18. The combination of a valve-shell adapted to be connected at its inner end to a tube or the like, an indicating member, yielding means connecting said indicating member and shell, said yielding means being connected to the shell inwardly of the indicating means, and a barrel fitting closely within said shell and retaining said yielding means in engagement with said shell.

19. The combination with a shell adapted to be connected at its inner end to a tire tube or the like, an indicating member in said shell, an extensible tube between said indicating member and one end of said shell, means for making a tight joint between said tube and shell, said means being operable from the outer end of said shell.

20. The combination with a shell adapted to be connected at its inner end to a tire tube or the like, an indicating member in said shell, an extensible tube between said indicating member and one end of said shel, a spring for opposing the movements of said indicating member, and means for making a tight joint between said tube and shell, and for engaging said spring and shell, said means being operable from the outer end of said shell.

In witness whereof, we have hereunto signed our names in the presence of two subscribing witnesses.

HENRY P. KRAFT.
MAXIMILIAN CHARLES SCHWEINERT.

Witnesses:
EUGENE V. NEYLES,
THEODORE T. SNELL.